United States Patent
May

(10) Patent No.: US 7,046,530 B2
(45) Date of Patent: May 16, 2006

(54) METHOD AND APPARATUS FOR CURRENT LIMITING OF AN OUTPUT OF A DC-TO-DC CONVERTER

(75) Inventor: Marcus W. May, Austin, TX (US)

(73) Assignee: Sigmatel, Inc., Austin, TX (US)

(*) Notice: Subject to any disclaimer, the term of this patent is extended or adjusted under 35 U.S.C. 154(b) by 103 days.

(21) Appl. No.: 10/603,547

(22) Filed: Jun. 25, 2003

(65) Prior Publication Data
US 2004/0105284 A1 Jun. 3, 2004

Related U.S. Application Data

(60) Provisional application No. 60/429,941, filed on Nov. 29, 2002.

(51) Int. Cl.
*H02H 7/122* (2006.01)
(52) U.S. Cl. .................... 363/56; 363/20; 361/93.6
(58) Field of Classification Search ............ 363/21.18, 363/21.1, 18, 19, 20, 59, 60; 323/276, 287, 323/265, 268; 361/93.1–93.6
See application file for complete search history.

(56) References Cited

U.S. PATENT DOCUMENTS

| | | | | | |
|---|---|---|---|---|---|
| 4,498,128 A | * | 2/1985 | Peterson et al. | ......... | 363/21.08 |
| 5,233,287 A | * | 8/1993 | Lenk | ......... | 323/268 |
| 5,483,182 A | * | 1/1996 | Rybicki | ......... | 327/5 |

* cited by examiner

*Primary Examiner*—Rajnikant B. Patel
(74) *Attorney, Agent, or Firm*—Garlick Harrison & Markison LLP; Timothy W. Markison

(57) ABSTRACT

A method for current limiting of an output of a DC-to-DC converter begins by determining a current loading duty cycle of the output of the DC-to-DC converter (i.e., the present duty cycle given the loading of on the output). The processing then continues by comparing the current loading duty cycle with a zero loading duty cycle of the output (i.e., the duty cycle when the output has no load). The processing continues by limiting duty cycle of the output to the zero loading duty cycle plus a duty cycle loading offset when the current loading duty cycle exceeds the zero loading duty cycle plus the duty cycle loading offset.

16 Claims, 5 Drawing Sheets multi-function handheld device 40 integrated circuit 12-2

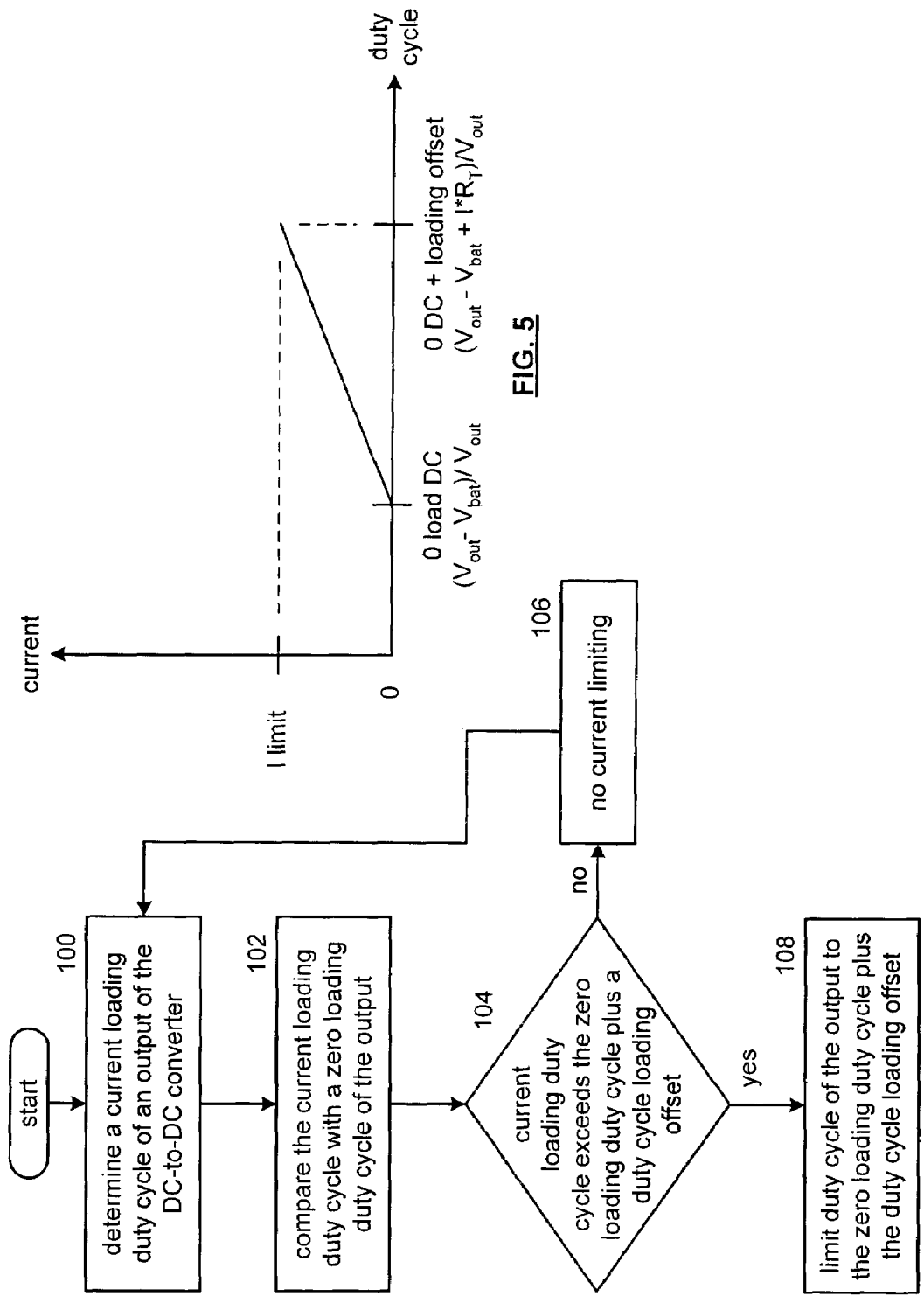

METHOD AND APPARATUS FOR CURRENT LIMITING OF AN OUTPUT OF A DC-TO-DC CONVERTER

This patent is claiming priority under 35 USC § 119(e) to provisionally filed patent application entitled MULTI-FUNCTION HANDHELD DEVICE, having a provisional Ser. No. of 60/429,941 and a provisional filing date of Nov. 29, 2002.

BACKGROUND OF THE INVENTION

1. Technical Field

This invention relates generally to portable electronic equipment and more particularly to controlling of the powering such equipment.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices include one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Further, minimizing power consumption, and thus, maximizing battery life is a crucial parameter when differentiating portable products. Therefore, switching converters that utilize discrete inductors are used to efficiently produce supply voltages for the integrated circuits inside the handheld devices. The use of inductors in power conversion produces much higher efficiencies than linear regulators but require that the converter current be strictly limited below a certain threshold. This important constraint is needed to keep the inductor's inductance value from dropping significantly (i.e., want to avoid saturating the inductor). If the inductance value drops when the current exceeds this threshold, the drop in inductance can damage the portable device or even pose a safety issue. One technique to prevent saturating the inductor is to include current limiting on the outputs of a DC-to-DC converter. Current limiting is achieved by measuring the current of an output and when the current exceeds a threshold, limiting the current of the output. One approach for measuring the output current is to include a transformer in the output path. This, however, is very difficult to do on an integrated circuit and thus is not used for ICs. Another approach for measuring the current is to include a resistor in the output path and measure the voltage drop across the resistor. While this measures the current, it increases power consumption and requires additional circuitry.

Therefore, a need exists for a method and apparatus to provide current limiting of an output current of an on-chip DC-to-DC converter without an increase in power consumption and without a magnetic element.

BRIEF SUMMARY OF THE INVENTION

The method and apparatus for current limiting in a DC-to-DC converter of the present invention substantially meets these needs and others. In one embodiment, a method for current limiting of an output of a DC-to-DC converter begins by determining a current loading duty cycle of the output of the DC-to-DC converter (i.e., the present duty cycle given the loading of on the output). The processing then continues by comparing the current loading duty cycle with a zero loading duty cycle of the output (i.e., the duty cycle when the output has no load). The processing continues by limiting duty cycle of the output to the zero loading duty cycle plus a duty cycle loading offset when the current loading duty cycle exceeds the zero loading duty cycle plus the duty cycle loading offset, which is done without the use of a transformer or current sensing resistor. Thus, substantially lossless current limiting is achieved.

In another embodiment, a method for current limiting a DC-to-DC converter begins by monitoring duty cycle of an output of the DC-to-DC converter to produce a monitored duty cycle. The processing continues by equating the monitored duty cycle to an output current based on a relationship between the output current and the duty cycle for the output of the DC-to-DC converter to produce an equated current. The processing continues by comparing the equated current with a current limit threshold. The processing continues by limiting the output current based on the current limit threshold when the equated current compares unfavorably with the current limit threshold.

BRIEF DESCRIPTION OF THE SEVERAL VIEWS OF THE DRAWINGS

FIG. 4 is a logic diagram of a method for current limiting of a DC-to-DC converter in accordance with the present invention;

FIG. 5 is a graph that plots duty cycle versus current in accordance with the teachings of the present invention.

DETAILED DESCRIPTION OF THE INVENTION

Figure 1:
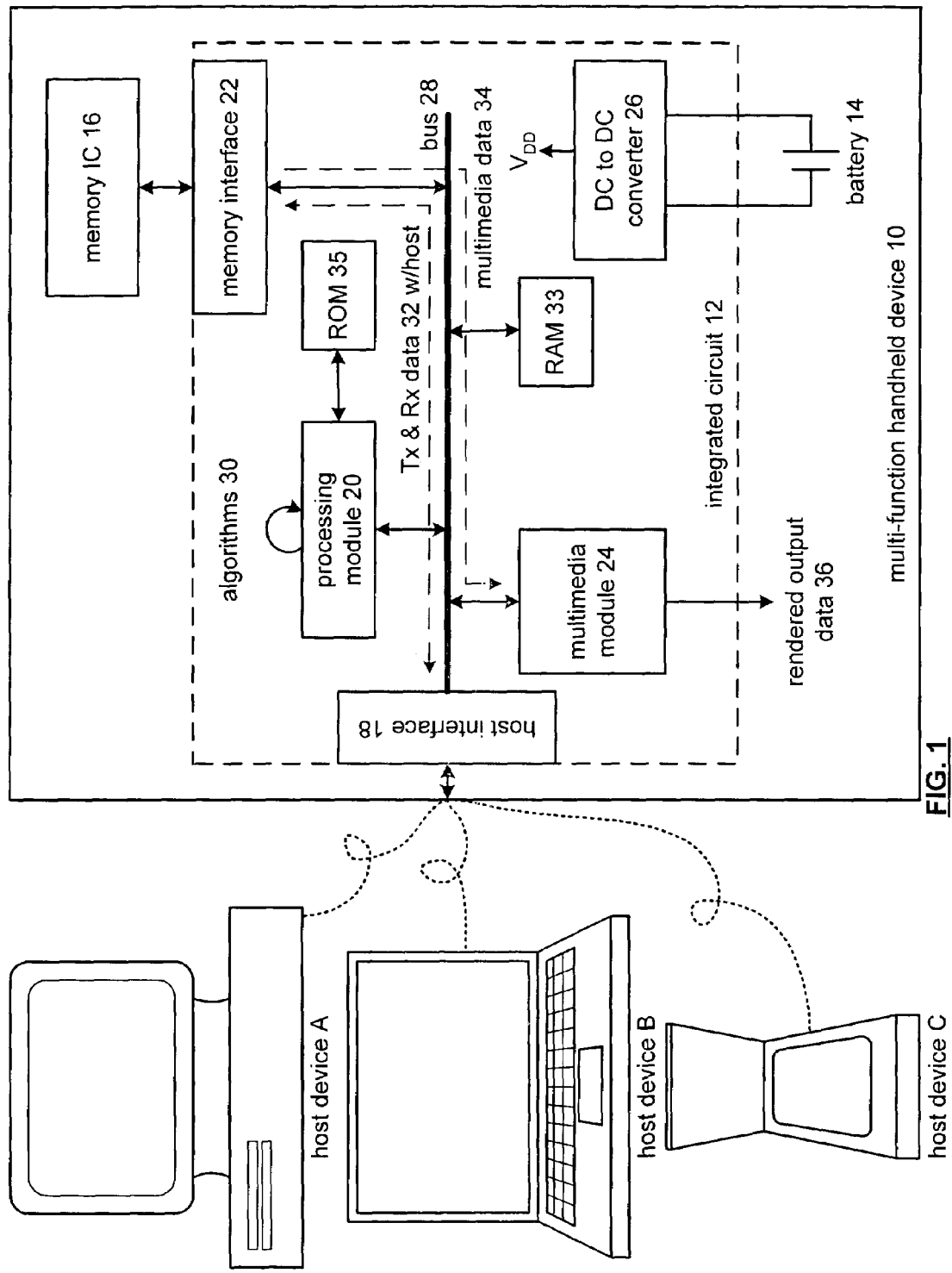
FIG. 1 is a schematic block diagram of a handheld device and corresponding integrated circuit in accordance with the present invention.

FIG. 1 is a schematic block diagram of a multi-function handheld device 10 and corresponding integrated circuit 12 operably coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, and a bus 28. The multimedia module 24 alone or in combination with the processing module 20 provides the functional circuitry for the integrated circuit 12. The DC-to-DC converter 26, which may be constructed in accordance with the teaching of U.S. Pat. No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide $V_{DD}$ to one or more of the other components of the handheld device 10.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 20 performs at least one algorithm 30, where the corresponding operational instructions of the algorithm 30 are stored in memory 16 and/or in memory incorporated in the processing module 20. The processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30.

In this mode, the processing module 30 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data will be formatted in a particular manner. For example, if the handheld device 10 is coupled to the host device via a USB cable, the received data will be in accordance with the format proscribed by the USB specification. The host interface module 18 converts the format of the received data (e.g., USB format) into a desired format by removing overhead data that corresponds to the format of the received data and storing the remaining data as data words. The size of the data words generally corresponds directly to, or a multiple of, the bus width of bus 28 and the word line size (i.e., the size of data stored in a line of memory) of memory 16. Under the control of the processing module 20, the data words are provided, via the memory interface 22, to memory 16 for storage. In this mode, the handheld device 10 is functioning as extended memory of the host device (e.g., like a thumb drive).

In furtherance of the first functional mode, the host device may retrieve data (e.g., Tx data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., Tx data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection. For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

As one of average skill in the art will appreciate, the data stored in memory 16, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. As one of average skill in the art will further appreciate, when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital dictaphone recording, MPEG file playback, JPEG file playback, text messaging display, cellular telephone functionality, and/or AM/FM radio reception. Each of these functions is known in the art, thus no further discussion of the particular implementation of these functions will be provided except to further illustrate the concepts of the present invention.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

As one of average skill in the art, the handheld device 10 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
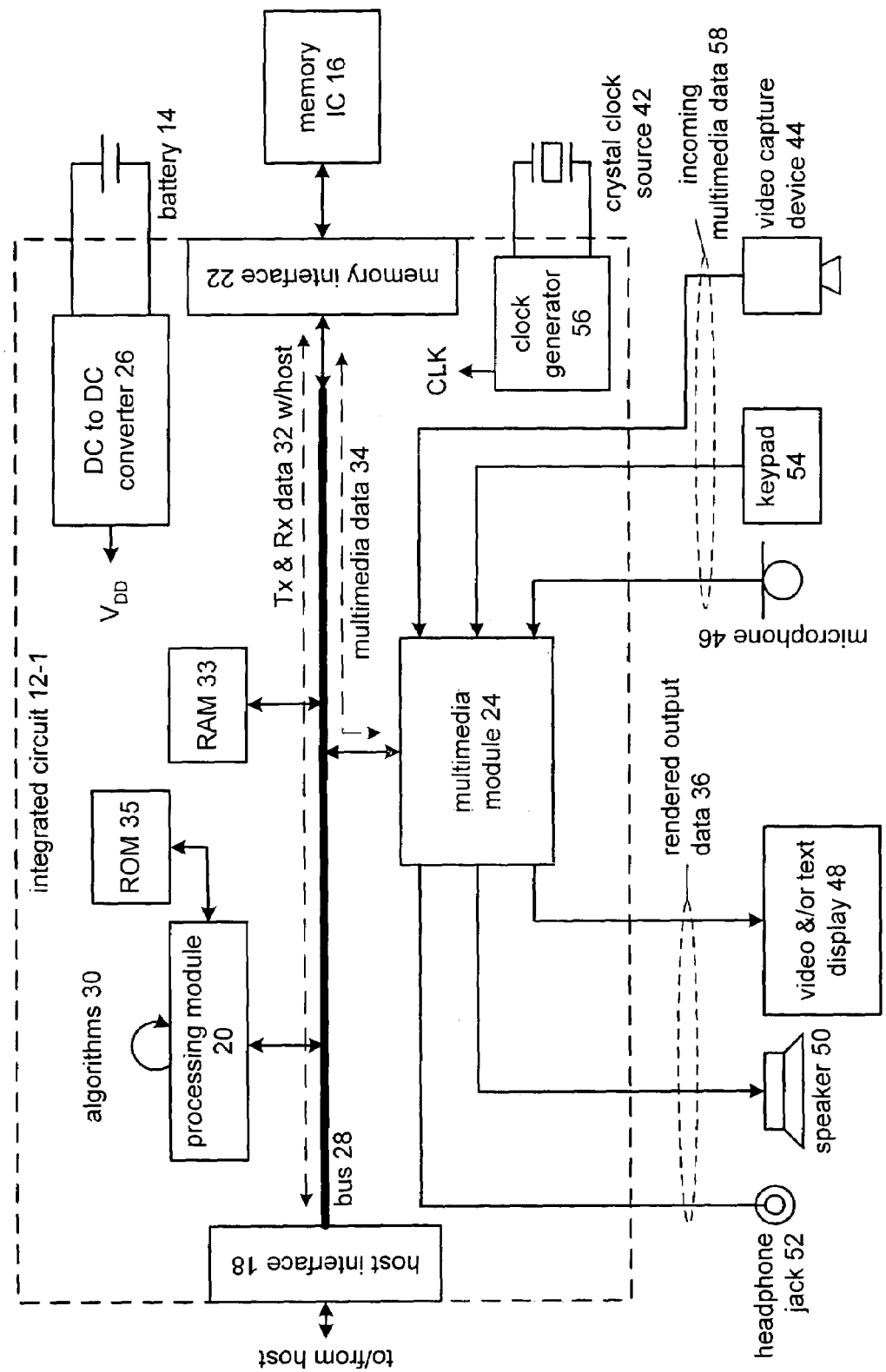
FIG. 2 is a schematic block diagram of another handheld device and corresponding integrated circuit in accordance with the present invention.

FIG. 2 is a schematic block diagram of another handheld device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, and a clock generator 56, which produces a clock signal (CLK) for use by the other modules. As one of average skill in the art will appreciate, the clock signal CLK may include multiple synchronized clock signals at varying rates for the various operations of the multi-function handheld device.

Handheld device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24 and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the key pad 54 (which may be a keyboard, touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode includes the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 an/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54.

Figure 3:
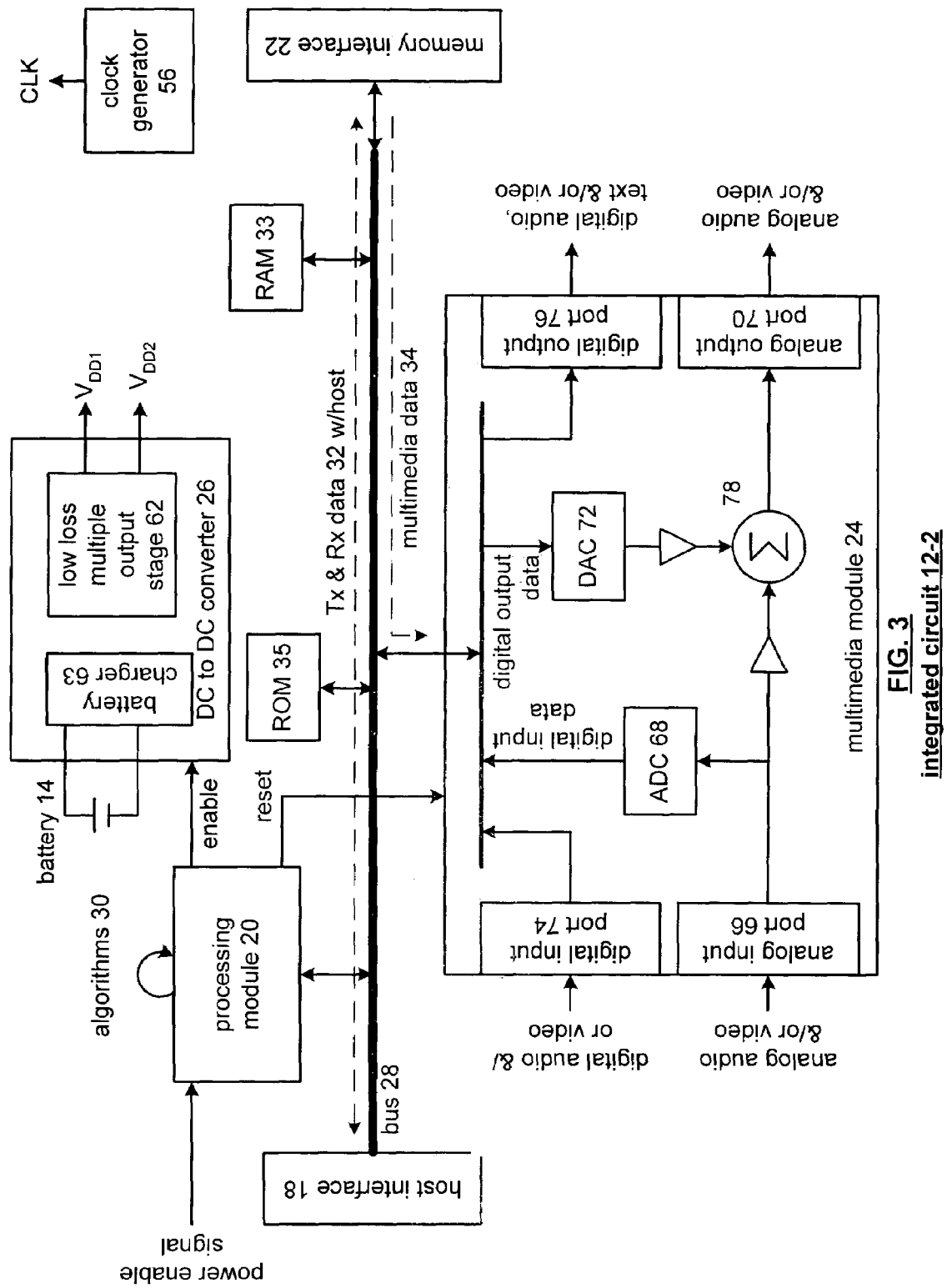
FIG. 3 is a schematic block diagram of another integrated circuit in accordance with the present invention.

FIG. 3 is a schematic block diagram of an integrated circuit 12-2 that may be used in a multi-function handheld device. The integrated circuit 12-2 includes the host interface 18, the processing module 20, the DC-to-DC converter 26, memory 60, the clock generator 56, the memory interface 22, the bus 28 and the multimedia module 24. The DC-to-DC converter 26 includes a first output section 62, and a second output section 64 to produce a first and second output voltage ($V_{DD1}$ and $V_{DD2}$), respectively. Typically, $V_{DD1}$ will be greater that $V_{DD2}$, where $V_{DD1}$ is used to source analog sections of the processing module 20, the host interface 18, the memory interface 22, and/or the multimedia module 22 and $V_{DD2}$ is used to source the digital sections of these modules. The DC-to-DC converter 26 may further include a battery charger 63 and a low loss multiple output stage 62. The battery charger 63 is operable to charge the battery 14 from power it receives via the physical coupling (e.g., via a USB cable) to the host device when the multi-function handheld device is physically coupled to the host device. The particular implementation of the battery charger 63 is dependent on the type of battery being used and such implementations are known in the art, thus no further discussion will be provided regarding the battery charger 63 except to further illustrate the concepts of the present invention.

The multimedia module 24 includes an analog input port 66, an analog to digital converter (ADC) 68, an analog output port 70, a digital to analog converter (DAC) 72, a digital input port 74, a digital output port 76, and an analog mixing module 78. The analog input port 66 is operably coupled to receive analog input signals from one or more sources including a microphone, an AM/FM tuner, a line in connection (e.g., headphone jack of a CD player), etc. The received analog signals are provided to the ADC 68, which produces digital input data therefrom. The digital input data may be in a pulse code modulated (PCM) format and stored as such, or it may be provided to the processing module 20 for further audio processing (e.g., compression, MP3 formatting, etc.) The digital input data, or the processed version thereof, is stored in memory 16 as instructed by the processing module 20.

The digital input port 74 is operably coupled to receive digital audio and/or video input signals from, for example, a digital camera, a camcorder, etc. The digital audio and/or video input signals may be stored in memory 16 under the control of the processing module 20. As one of average skill in the art will appreciate, the audio and/or video data (which was inputted as analog signals or digital signals) may be stored as raw data (i.e., the signals received are stored as is in designated memory locations) or it may be stored as processed data (i.e., compressed data, MPEG data, MP3 data, WMA data, etc.).

The DAC 72 receives multimedia data 34 as digital output data and converts it into analog video and/or audio output data that is provided to the mixing module 78. When the output of the DAC 72 is the only input to the mixing module 78, the mixing module 78 outputs the analog video and/or audio output data to the analog output port 70. The analog output port 70 may be coupled to one or more of the speaker, headphone jack, and a video display. The mixing module 78 may mix analog input signals received via the analog input port 66 with the output of DAC 72 to produce a mixed analog signal that is provided to the analog output port 70. Note that the buffers in series with the inputs of the mixing module 78 may have their gains adjusted and/or muted to enable selection of the signals at various gain settings provided to the mixing module 78 and subsequently outputted via the analog output port 70.

The digital output port 76 is operably coupled to output the digital output data (i.e., the multimedia data 34 in a digital format). The digital output port 76 may be coupled to a digital input of a video display device, another handheld device for direct file transfer, etc.

As one of average skill in the art will appreciate, the multimedia module 24 may include more or less components than the components shown in FIG. 3 or include multiple analog and/or digital input and/or output ports. For example, for a playback mode of digital audio files, the multimedia module 24 may only include the DAC 72 and the analog output port 70 that is coupled to the headphone jack and/or to the speaker. As another example, for recording voice samples (i.e., as a digital dictaphone), the multimedia module 24 may include the analog input port 66 coupled to the microphone and the ADC.

FIG. 4 illustrates a logic diagram of a method that may be implemented by the regulation module 88 to provide current limiting for the DC-to-DC converter 26. The process begins at Step 100 where the regulation module determines a current loading duty cycle of an output of the DC-to-DC converter. With reference to FIG. 5, a given duty cycle of the DC-to-DC converter corresponds to a given inductor current. In general, the duty cycle is the fraction of a clock period during which the magnetic filed in the inductor is increasing. As the load increases, i.e., the inductor is supplying more current, the duty cycle of the regulation signal increases. As shown in FIG. 5, when 0 current (i.e., no load) is being sourced by the particular output, the duty cycle corresponds to $(V_{out}-V_{bat})/V_{out}$ for a boost converter. As load is applied to this particular output, where output current equals the inductor current times the fraction of time the inductor is coupled to the output, the duty cycle is approximately represented by the equation $(V_{out}-V_{bat}+I*R_T)/V_{out}$ (note that the frequency dependent values, i.e., inductance, capacitance, of the transistor are omitted in this equation, but could be included), where $R_T$ corresponds to the impedance of the corresponding switching transistor and I represents the inductor current. Accordingly, a particular value of the inductor current will have a corresponding duty cycle value.

Returning to the logic diagram of FIG. 4, the process proceeds to Step 102 where the current loading duty cycle is compared with a zero loading duty cycle of the output plus a duty cycle loading offset. The process then proceeds to Step 104 where a determination is made as to whether the current loading duty cycle exceeds the zero loading duty cycle plus the duty cycle loading offset. The duty cycle loading offset corresponds to the desired current limit setting. Again with reference to FIG. 5, the duty cycle loading offset corresponds to the $I*R_T$ component of the duty cycle with load. For example, if the battery voltage is 1.5 volts and the output voltage is 2.5 volts, the no load duty cycle is 40% (i.e., (2.5−1.5)/2.5). Further, for this example, if the desired current limit is 100 mA and $R_T$ is 2 Ohms, then the corresponding current limiting duty cycle is 48% (i.e., (2.5−1.5+(0.10)*(2))/2.5). Thus, for this example, if the regulation module 88 determines that the duty cycle is 48%, it limits the duty cycle to 48%. By limiting the duty cycle, the inductor current is limited to the 100 mA and if the load continues, the output voltage drops below the 2.5 volts.

If, at step 104, it is determined that the current loading does not exceed the zero current loading plus the duty cycle offset, the process proceeds to Step 106 where no current limiting is applied and the process repeats at step 100. If, however, the current loading duty cycle exceeds or equals the zero loading duty cycle plus a duty cycle loading offset, the process proceeds to Step 108. At Step 108 the duty cycle is limited for the corresponding output based on the zero loading duty cycle plus the duty cycle loading offset. As a general example, with reference to FIG. 5, as the inductor current increases from zero, the duty cycle increases linearly based on I*RT, which establishes a relationship between the duty cycle and the inductor current. Once the duty cycle reaches the zero duty cycle plus the loading offset, the current will be at a particular level (i.e., I limit). At this point, the duty cycle is clamped to this value thus clamping the current to this corresponding level.

Figure 6:
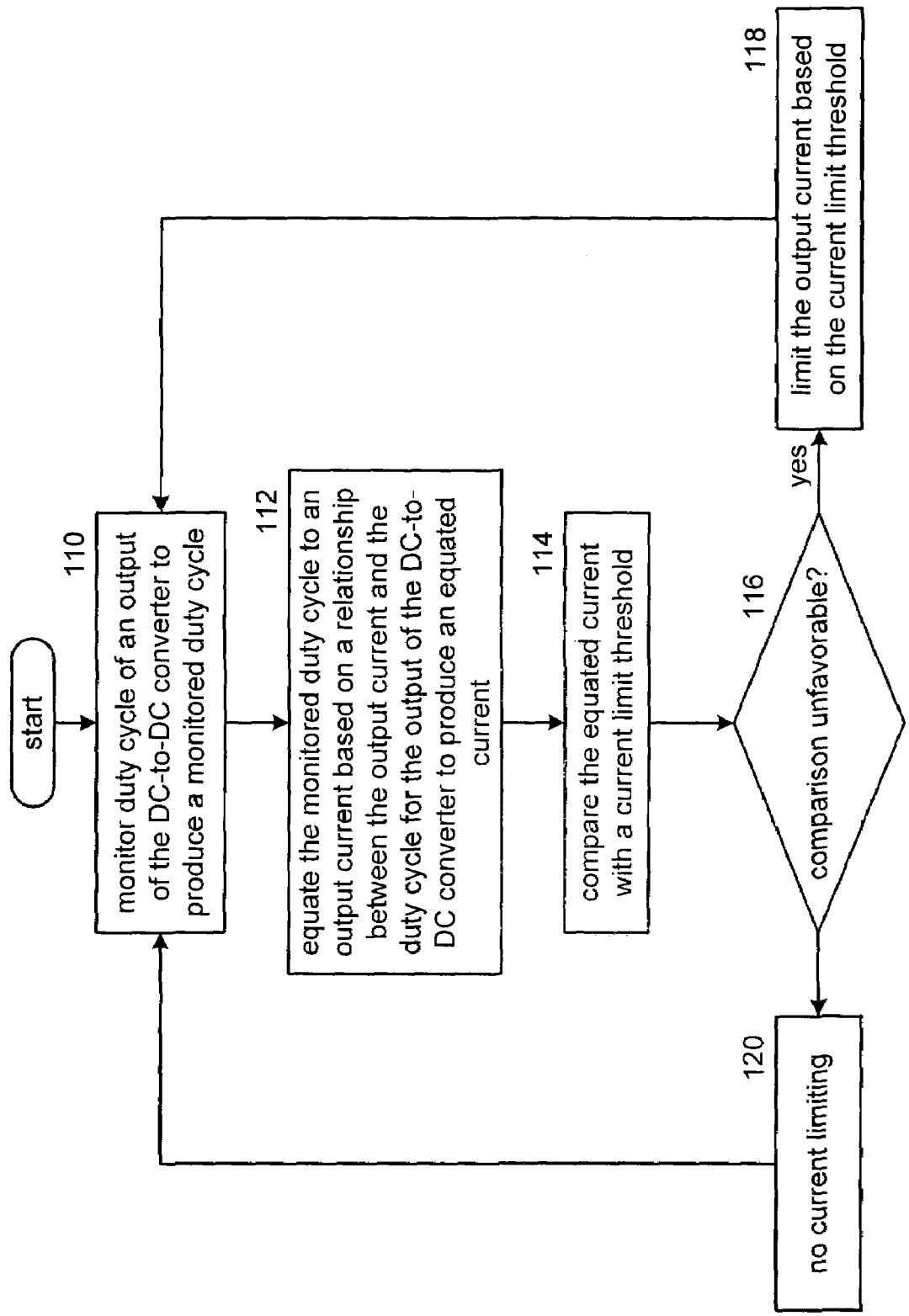
FIG. 6 is a logic diagram of another method for current limiting of a DC-to-DC converter in accordance with the present invention.

FIG. 6 is a logic diagram of an alternate method for current limiting a DC-to-DC converter. The process begins at step 110 where the regulation module monitors the duty cycle of a DC-to-DC converter to produce a monitored duty cycle. The process then proceeds to step 112, where the regulation module equates the monitored duty cycle to an inductor current based on a relationship between the inductor current and the duty cycle of the DC-to-DC converter to produce an equated current. The equating may be done by solving an equation of $$DC = \frac{Vout - Vbat + Icl * Rt0}{Vout},$$

where DC represents the duty cycle of the converter, Vout represents voltage of the output, Vbat represents voltage of a battery, Icl represents the desired current limit of the output, and Rt0 represents on-resistance of an output switching transistor of the output. Note that the equation could be expanded to account for the parasitic components of Rt0.

The process then proceeds to step 114, where the regulation module compares the equated current with a current limit threshold. The process then proceeds to step 116 where a determination is made as to whether to comparison was unfavorable. If the comparison was unfavorable, the process proceeds to step 118, where the regulation module limits the output current based on the current limit threshold and the process reverts to step 110. If the comparison was favorable, the process proceeds to step 120, where the output current is not limited and the process reverts to step 110.

As one of average skill in the art will appreciate, the current limiting described above was for a boost converter, but also works for a buck converter, fly-back converter, half bridge converter, full bridge converter, and/or any converter that regulates a DC output via pulse width modulation. As one of average skill in the art will further appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for providing current limiting of one or more outputs of an on-chip DC-to-DC converter in a lossless manner and does so with minimal additional low power logic circuitry within the regulation module to analyze and limit the duty cycle of an output. As one of average skill in the art will appreciate, other embodiments may be derived from the teachings of the present invention without deviating from the scope of the claims.

What is claimed is:

1. A method for current limiting in a DC-to-DC converter, the method comprises:
   determining a current loading duty cycle of the DC-to-DC converter;
   comparing the current loading duty cycle with a zero loading duty cycle of the output; and
   when the current loading duty cycle exceeds the zero loading duty cycle plus a duty cycle loading offset, limiting duty cycle of the DC-to-DC converter to the zero loading duty cycle plus the duty cycle loading offset.

2. The method of claim 1, wherein the duty cycle loading offset corresponds to desired maximum inductor current of the DC-to-DC converter.

3. The method of claim 1 further comprises:
   equating the zero loading duty cycle to $$\frac{Vout - Vbat}{Vout},$$

where Vout represents an output voltage of the DC-to-DC converter and Vbat represents voltage of a battery.

4. The method of claim 1 further comprises:
   equating the duty cycle loading offset to $I_{cL}*R_{T0}$, wherein $I_{CL}$ represents the desired current limit of the inductor current and $R_{T0}$ represents an impedance of an output switching transistor of the output.

5. The method of claim 1 further comprises:
   equating the current loading duty cycle to $$\frac{Vout - Vbat + Icl*Rt0}{Vout},$$

where Vout represents an output voltage of the DC-to-DC converter, Vbat represents voltage of a battery, Icl represents the desired current limit of the inductor current, and Rt0 represents an impedance of an output switching transistor of the output.

6. A method for current limiting a DC-to-DC converter, the method comprises:
   monitoring duty cycle of the DC-to-DC converter to produce a monitored duty cycle;
   equating the monitored duty cycle to an inductor current based on a relationship between the inductor current and the duty cycle of the DC-to-DC converter to produce an equated current;
   comparing the equated current with a current limit threshold; and
   when the equated current compares unfavorably with the current limit threshold, limiting the inductor current based on the current limit threshold.

7. The method of claim 6, wherein the monitoring the duty cycle further comprises:
   determining a digital value based on an output regulation signal that regulates an output of the DC-to-DC converter; and
   converting the digital value to a percentage of a maximum digital value to produce the monitored duty cycle.

8. The method of claim 6, wherein equating the monitored duty cycle to the inductor current further comprises:
   solving an equation of $$DC = \frac{Vout - Vbat + Icl*Rt0}{Vout},$$

where DC represents the duty cycle of the DC-to-DC converter, Vout represents an output voltage of the DC-to-DC converter, Vbat represents voltage of a battery, Icl represents the desired current limit of the inductor, and Rt0 represents an impedance of an output switching transistor of the output.

9. An on-chip DC-to-DC converter comprises:
   a regulation module operably coupled to produce a regulation signal;
   output capacitance operably coupled to the first output;
   an integrated circuit (IC) pad for coupling to an external inductor;
   an output stage operably coupled to the output capacitance, the IC pad, and the regulation module to produce an output based on the regulation signal, wherein the regulation module provides current limiting of the output by:
   determining a current loading duty cycle of an output of the DC-to-DC converter;

comparing the current loading duty cycle with a zero loading duty cycle of the output; and when the current loading duty cycle exceeds the zero loading duty cycle plus a duty cycle loading offset, limiting duty cycle of the output to the zero loading duty cycle plus the duty cycle loading offset.

10. The DC-to-DC converter of claim 9, wherein the duty cycle loading offset corresponds to desired maximum inductor current of the DC-to-DC converter.

11. The DC-to-DC converter of claim 11, wherein the regulation module further functions to:

equating the zero loading duty cycle to $$\frac{Vout - Vbat}{Vout},$$

where Vout represents voltage of the output and Vbat represents voltage of a battery.

12. The DC-to-DC converter of claim 9, wherein the regulation module further functions to:

equating the duty cycle loading offset to $I_{CL}*R_{T0}$, wherein $I_{CL}$ represents the desired current limit of the inductor current and $R_{T0}$ represents an impedance of an output switching transistor of the output.

13. The DC-to-DC converter of claim 9, wherein the regulation module further functions to:

equating the current loading duty cycle to $$\frac{Vout - Vbat + Icl*Rt0}{Vout},$$

where Vout represents voltage of the output, Vbat represents voltage of a battery, Icl represents the desired current limit of the inductor current, and Rt0 represents an impedance of an output switching transistor of the output.

14. An on-chip DC-to-DC converter comprises:

a regulation module operably coupled to produce a regulation signal;

output capacitance operably coupled to the first output;

an integrated circuit (IC) pad for coupling to an external inductor;

an output stage operably coupled to the output capacitance, the IC pad, and the regulation module to produce an output based on the regulation signal, wherein the regulation module provides current limiting of the output by:

monitoring duty cycle of an output of the DC-to-DC converter to produce a monitored duty cycle;

equating the monitored duty cycle to an inductor current based on a relationship between the inductor current and the duty cycle for the output of the DC-to-DC converter to produce an equated current;

comparing the equated current with a current limit threshold; and when the equated current compares unfavorably with the current limit threshold, limiting the inductor current based on the current limit threshold.

15. The DC-to-DC converter of claim 14, wherein regulation module further functions to monitor the duty cycle by:

determining a digital value based on an output regulation signal that regulates the output; and converting the digital value to a percentage of a maximum digital value to produce the monitored duty cycle.

16. The DC-to-DC converter of claim 14, wherein regulation module further functions to equate the monitored duty cycle to the output current by:

solving an equation of $$DC = \frac{Vout - Vbat + Icl*Rt0}{Vout},$$

where DC represents the duty cycle of the output, Vout represents voltage of the output, Vbat represents voltage of a battery, Icl represents the desired current limit of the inductor current, and Rt0 represents an impedance of an output switching transistor of the output.

* * * * *